A. KANZEE.
TIRE TREAD.
APPLICATION FILED APR. 17, 1912.
1,143,124.
Patented June 15, 1915.
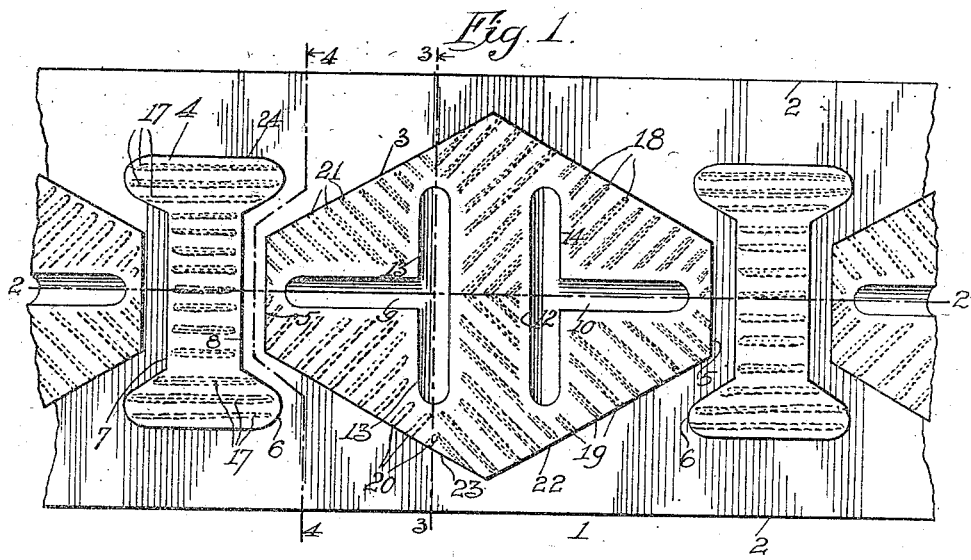
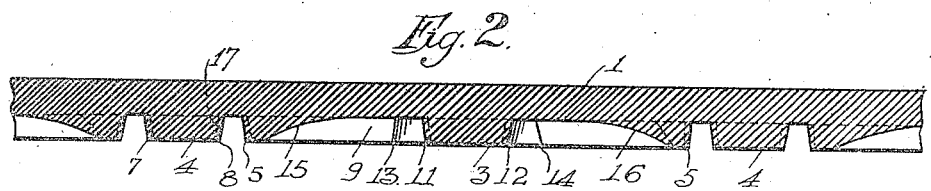
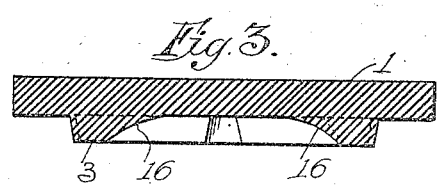
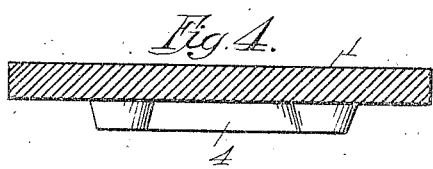
WITNESSES
INVENTOR
Austin Kanzee
BY
ATTORNEY

UNITED STATES PATENT OFFICE.

AUSTIN KANZEE, OF SAN FRANCISCO, CALIFORNIA.

TIRE-TREAD.

1,143,124.  Specification of Letters Patent.  Patented June 15, 1915.

Application filed April 17, 1912. Serial No. 691,279.

*To all whom it may concern:*

Be it known that I, AUSTIN KANZEE, a citizen of the United States, residing at San Francisco, in the county of San Francisco and State of California, have invented new and useful Improvements in Tire-Treads, of which the following is a specification.

This invention relates to improvements in tire treads.

It is one of the objects of my invention to provide a tire tread having raised tractive projections disposed along the tread surface or face and suitably spaced apart from each other, said projections being so arranged as to overlap each other so that one extremity of one projection will extend beyond the extremities of the adjacent projections thereby forming a continuous tread surface.

It is a further object of my invention to provide certain of the tractive projections, all of which are raised radially upwardly from the body of the tire, with recesses or suction cups to cause the tire to adhere to the surface over which it is being advanced and thereby assist in eliminating or reducing skidding and slipping of the wheels.

It is a further object of my invention to provide the raised tractive projections with fabric strips which are preferably molded into the projections when the same are formed and which strips are disposed radially edgewise with respect to the tire, and preferably in spaced parallel relation with respect to each other. I desirably provide raised projections of different configurations and find it desirable to arrange the fabric strips in groups, with the strips of one group being disposed at an angle to the adjacent group of strips, and certain of the groups of strips being disposed in angular relation with respect to the central line of drive of the tread.

My invention will be more fully described in connection with the accompanying drawing and will be more particularly pointed out in and by the appended claims.

In the drawing:—Figure 1 is a developed face view of a tread showing one embodiment of my invention. Fig. 2 is a sectional view on line 2—2 of Fig. 1. Fig. 3 is a sectional view on line 3—3 of Fig. 1. Fig. 4 is a sectional view on line 4—4 of Fig. 1.

Like characters of reference designate similar parts throughout the different figures of the drawing.

The body of the tread is indicated at 1 and is provided within its lateral margins 2, with a series of facial radially elevated or raised tractive projections 3 and 4. As illustrated, the projections 3 are of diamond-shaped configuration and the projections 4 are substantially I-shaped, although it will be understood that I do not wish to be limited to this precise construction. These projections, according to my invention, are so arranged that the extremities 5 of the projections 3 extend in overlapping relation or past the extremities 6, of the projections 4. By means of this arrangement, a continuous elevated or raised tractive surface is provided by means of spaced projections by reason of the fact that the extremities 5 will engage the road surface prior to the time the extremities 6 leave the road surface. This arrangement, by reason of the spacing of the projections, provides for an effective tractive drive by presenting spaced corner or marginal projections. Going in either direction, the margins 7 or 8, throughout the outline of the I-shaped projections 4, act as tractive corners and so likewise do the extremities 5 of the projections 3.

In the embodiment shown, only the projections 3 have facial recesses or suction cups 9 and 10, preferably T-shaped, and the margins 11, 12, 13 and 14 of these suction cups likewise form effective tractive portions lying in, and on opposite sides, of the line of drive. The line of drive is coincident with the section line 2—2. In order to avoid filling the suction cups with loose surface material of the road, as far as possible, I desirably curve the bottoms 15 and 16, as shown in Fig. 2. Likewise as shown in Fig. 3, the end portions 16 are curved to avoid sharp corners in the hollow bases of said cups. It will be understood that the extremities of T-shaped suction cups are not relied upon to present tractive portions.

In order to enhance the wearing qualities of the road engaging faces of the projections as much as possible, I provide the same with strips preferably made of fabric, and which are disposed in radial edgewise relation to the tire, and in spaced relation with respect to each other.

In the projections 4, the strips 17 are arranged parallel with the line of drive and in parallel relation with respect to each other and transversely with respect to the longitudinal axis of the projections 4. The edges of these strips extend to the outer face of the projections 4 and toward the base thereof, and preferably not into the body 1 of the tire. By reason of this arrangement, the projections are stiffened and toughened to stand wear and the flexibility of the body portion 1 is in no way impaired.

By reason of the angular configuration of the margins of the projections 3, I preferably dispose the strips in groups, to present as much of the strip edge to the surface as possible. On one side of the line of drive, and on one end of the projections 3, the group 18 has its strips arranged angularly to the line of drive and the strips 18 and 19 diverge from the line of drive. The groups 20 and 21 are angularly disposed with respect to the line of drive and also with respect to the disposition of the strips 18 and 19. It will also be seen that effective skid-resisting edges 22 and 23 are presented laterally along the projections 3 and angularly to the margins 2. Such surfaces 24 are also presented by the projections 4, which surfaces are parallel with the sides 2.

It will be seen from the foregoing, that my invention includes the method of molding a tire having a body portion and elevated tractive projections, and in molding in said projections a series of wearing strips disposed radially edgewise of the tire and not extending into the body portion thereof.

While I have herein shown and described one specific embodiment of my invention, it will be understood that I do not wish to be limited thereto except for such limitations as the claims may import.

I claim:—

1. A tire having a tread portion provided with a series of radially elevated tractive projections, and strips of fabric molded into said projections and disposed radially edgewise with respect to the tire, the strips in some of said projections being parallel with the line of drive and the strips of other projections being angular with respect to the line of drive, substantially as described.

2. A tire having disposed on its surface portion a series of raised tractive projections disposed in spaced relation with respect to each other and with one extreme portion of one projection extending beyond the extremity of the next adjacent projection, thereby forming a continuous overlapping series, and fabric strips molded in said projections, said strips being disposed radially edgewise with respect to the tire, the strips in alternate projections being disposed in a circumferential direction with respect to the tire and those in the intermediate projections being disposed at an angle with respect to the circumferential direction.

3. A tire having disposed on its surface portion a series of raised tractive projections disposed in spaced relation with respect to each other and with one extreme portion of one projection extending beyond the extremity of the next adjacent projection, thereby forming a continuous overlapping series, and fabric strips molded in said projections, said strips being disposed radially edgewise with respect to the tire, the strips in alternate projections being disposed in a circumferential direction with respect to the tire and those in the intermediate projections being disposed at right angles to each other.

In testimony whereof I affix my signature in presence of two witnesses.

AUSTIN KANZEE.

Witnesses:
 LOUIS E. MARSH,
 JOHN J. CORDY.